United States Patent
Wiener et al.

(10) Patent No.: US 6,890,036 B2
(45) Date of Patent: May 10, 2005

(54) DRIVER PROTECTION SYSTEM FOR MOBILE OPERATING MEANS

(75) Inventors: Uwe Wiener, Dusseldorf (DE); Dietrich Elbracht, Hamburg (DE); Günter Pfeiffer, Kempen (DE); Frank Dellen, Oberhausen (DE); Monika Bitzer, Moers (DE); Oliver Schroter, Mulheim/Ruhr (DE)

(73) Assignee: IWS, Ingenieurgesellschaft Weinter & Schröter mbH, Kamp-Lintfort (DE)

( * ) Notice: Subject to any disclaimer, the term of this patent is extended or adjusted under 35 U.S.C. 154(b) by 16 days.

(21) Appl. No.: 10/343,074
(22) PCT Filed: Jul. 18, 2001
(86) PCT No.: PCT/DE01/02706
§ 371 (c)(1), (2), (4) Date: May 9, 2003
(87) PCT Pub. No.: WO02/08024
PCT Pub. Date: Jan. 31, 2002

(65) Prior Publication Data
US 2003/0168902 A1 Sep. 11, 2003

(30) Foreign Application Priority Data
Jul. 26, 2000 (DE) .......... 100 36 253

(51) Int. Cl.$^7$ .......... B60R 21/00
(52) U.S. Cl. .......... 297/487; 297/216.1; 280/748
(58) Field of Search .......... 297/487, 488, 297/216.1, 464; 280/751, 748; 180/272

(56) References Cited

U.S. PATENT DOCUMENTS

| | | |
|---|---|---|
| 4,392,660 A | 7/1983 | Mason et al. |
| 4,431,234 A | 2/1984 | Lacey |
| 5,853,193 A * | 12/1998 | Marshall .......... 280/748 |
| 6,530,448 B2 * | 3/2003 | Abels et al. .......... 280/748 |

FOREIGN PATENT DOCUMENTS

| | | |
|---|---|---|
| EP | 0 992 382 A | 4/2000 |
| JP | 62 1666139 A | 7/1987 |
| JP | 10 129992 A | 8/1998 |

* cited by examiner

Primary Examiner—Anthony D. Barfield
(74) Attorney, Agent, or Firm—Dougherty, Clements, Hofer & Bernard

(57) ABSTRACT

A system for protecting a driver's cab of a commercial vehicle or mobile equipment having a driver's seat, including a driver-protection roof open laterally at least on one side, having front and rear members connected by cross-members, and having an ellipsoidal bar-type frame comprising a top ellipse bar and a bottom ellipse bar.

7 Claims, 3 Drawing Sheets

DRIVER PROTECTION SYSTEM FOR MOBILE OPERATING MEANS

FIELD OF THE INVENTION

The present invention relates generally to a driver-protection system for mobile equipment, in particular the driver's cab of a commercial vehicle with a driver's seat.

BACKGROUND OF THE INVENTION

A number of safety systems for protecting a driver are known in the prior art. In particular, in the case of vehicles such as fork-lift trucks, it is necessary to protect the driver against injury, in particular injury as a result of load and centrifugal-force-induced accidents or roadway-induced overturning.

Although a number of manufacturers provide systems for the stability control of such vehicles during cornering and/or travelling with a raised load, and the overturning immunity of the vehicle such as a fork-lift truck is thus increased, it is not possible to rule out overturning on account of unevennesses in the roadway and driving errors, with the result that it systems which have to be either installed in the system from the outset or retrofitted.

In addition to the abovementioned active systems, the prior art also includes driver-protection systems in the case of which accident protection is ensured by means of a belt, a bar or a specific configuration of the cab.

In the case of a safety arrangement which is known from DE-298 18 149 U1, a restraining bar extends between two adjacent pillars of a driver's cab, one end section of said restraining bar being fastened, via an articulation, on one pillar, for example the B-pillar, of a driver's cab. Provided on the other pillar, for example the A-pillar, is a locking means, which can secure the retaining bar in its closed position.

A disadvantage with this solution is that considerable production outlay is necessary in order to fasten the locking device, on the one hand, and the pivoting articulation, on the other hand, on the two pillars.

A further safety arrangement is described in DE-200 02 106 U1. This safety arrangement according to the above-mentioned utility model comprises a pivoting articulation which is fastened on a pillar and bears a retaining arm which projects into an opening of the driver's cab, the safety arrangement being characterized in that a locking means is arranged in the region of the pivoting articulation.

This type of solution is intended to be more straightforward than the restraining mechanism described above in that, as a result of the pivoting articulation being combined with the locking device, only a single installation step is necessary.

Common to both the systems described above, however, is the fact that they only protect the driver to an insufficient extent against injury.

Common to all the systems known in the prior art, however, is the fact that they have one or more disadvantages in the following connection:

the system is not always effective without the help of the driver when the vehicle is travelling;
 the drivers are impeded when climbing into and out of the vehicle or when reversing;
 the system is not suitable for all heights; and
 the system is not maintenance-free or reliable and cannot easily be checked during servicing.

It is therefore an object of the invention to provide a driver-protection system which, as far as possible, eliminates all of the above-mentioned disadvantages of the systems known in the prior art.

BRIEF DESCRIPTION OF THE INVENTION

The object of the invention is achieved by providing a driver-protection system having the features claimed herein.

The invention thus relates to a driver-protection system for commercial vehicles with a driver's seat, a driver-protection roof, which is open laterally at least on one side, comprising front and rear members and an ellipsoidal bar-type frame with a top ellipse bar and a bottom ellipse bar, wherein the bars of the ellipsoidal bar-type frame, the bars being connected to one another at their ends, are articulated on one member by means of a hinge and are retained on the other member by means of a locking system, and wherein the hinge is fitted on one member, above the backrest, and the locking system is fitted on the other member, level with the seat surface of the seat.

Configuring the driver-protection system in the form of the ellipsoidal bar-type frame with a top ellipse bar and a bottom ellipse bar ensures that the arm, body and leg regions of the driver are protected in the lateral direction irrespective of the height of the driver. Hip, knee and shoulder points are protected for all driver heights, from the shortest female to the tallest male, by the adapted radii of the ellipsoidal bar.

The driver-protection system is suitable for all types of commercial vehicle such as fork-lift trucks, tractors and construction and agricultural vehicles.

In order to reduce the risk of injury, the ellipsoidal bar-type frame is preferably produced from a rectangular profile.

In order to increase the rigidity and for the increased protection of the driver, a further preferred embodiment provides a retaining bar which starts approximately in the centre of the bottom bar of the ellipsoidal bar-type frame and is articulated on the member via a further hinge, beneath the first hinge, approximately level with the transition region between the backrest and seat of the vehicle seat. This embodiment further increases the rigidity of the system and additionally protects the pelvic region of the driver by means of the retaining bar. Furthermore, this embodiment does not restrict the freedom of movement of the vehicle driver since sufficient freedom for elbow movement is provided between the retaining bar and the two ellipse bars.

In a further preferred embodiment, the retaining bar is extended beyond the bottom ellipse bar, with the result that it is secured on the top ellipse bar. This embodiment results in increased torsional rigidity of the ellipsoidal bar. It is further advantageous, in the case of this embodiment, if provided between the bottom ellipse bar and the retaining bar is a triangular protective panel which is made of sheet metal and may be provided, for example, with a securing means for a hip pad.

The hinges used according to the invention and the fastening mechanism are preferably configured as a screw-type or clamping fastening, with the result that the securing mechanism according to the invention can easily be retrofitted.

A preferred embodiment provides means which cause the securing mechanism according to the invention to be automatically closed and/or kept closed. These means may be configured, for example, in the form of a spring, by the hinge or the hinges being fitted obliquely or by a restoring spring installed in the hinges.

It is further advantageous for the locking system to have a spring catch, a turn-lock fastener or the like.

BRIEF DESCRIPTION OF THE DRAWINGS

The invention is explained in more detail in the following description with reference to an exemplary embodiment illustrated in the drawings, in which.

DETAILED DESCRIPTION OF THE INVENTION

Figure 1:
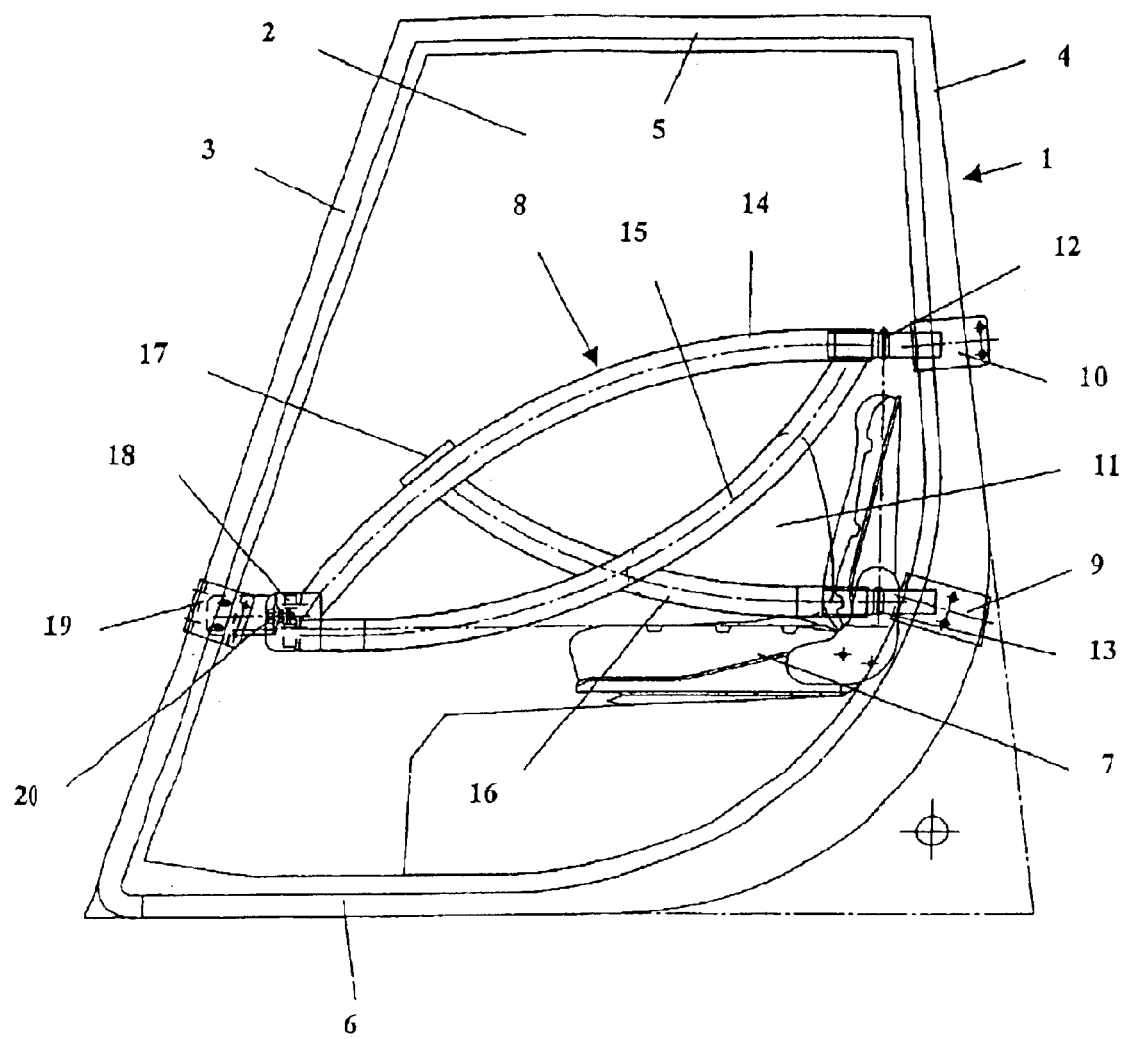
FIG. 1 shows a side view of a driver-protection roof for a fork-lift truck with the driver-protection system installed.

As is shown in FIG. 1, in the side view of the driver-protection roof 1, the lateral opening 2 is bounded on the front side by the A-pillar 3 and on the rear side by the B-pillar 4, at the top by the top crossmember 5, and at the bottom by the bottom crossmember 6, of the driver-protection roof. The driver's seat 7 is arranged in a displaceable manner on a base, and the driver-protection system 8 according to the invention subdivides the lateral opening 2 of the driver-protection roof.

In the case of the embodiment shown in FIG. 1, the driver-protection system 8 according to the invention has a bottom fastening element 9, a top fastening element 10 and a support panel 11, for example for a hip pad, arranged between the bottom ellipse bar 15 and the retaining bar 16.

At the top end of the ellipse-bar frame, the latter is connected to the top fastening element 10 via the hinge 12, while the retaining bar, preferably extending forwards from the B-pillar in the embodiment shown in the figure, runs beyond the bottom ellipse bar 15 to the top ellipse bar 14 and is secured on the latter. This configuration further increases the rigidity and the protective action of the protective system.

The retaining bar 16 preferably has an actuating element 17 with pulling connection, in the transition region to the top ellipse bar 14, in order to actuate the locking device 18, provided in the front region of the ellipse-bar frame, with locking bolt 20. In a particularly preferred embodiment, the actuating element 17, for ergonomic reasons, is integrated in the extended retaining bar. The locking device 18 is secured on the front A-pillar via the securing means 19.

Figure 2:
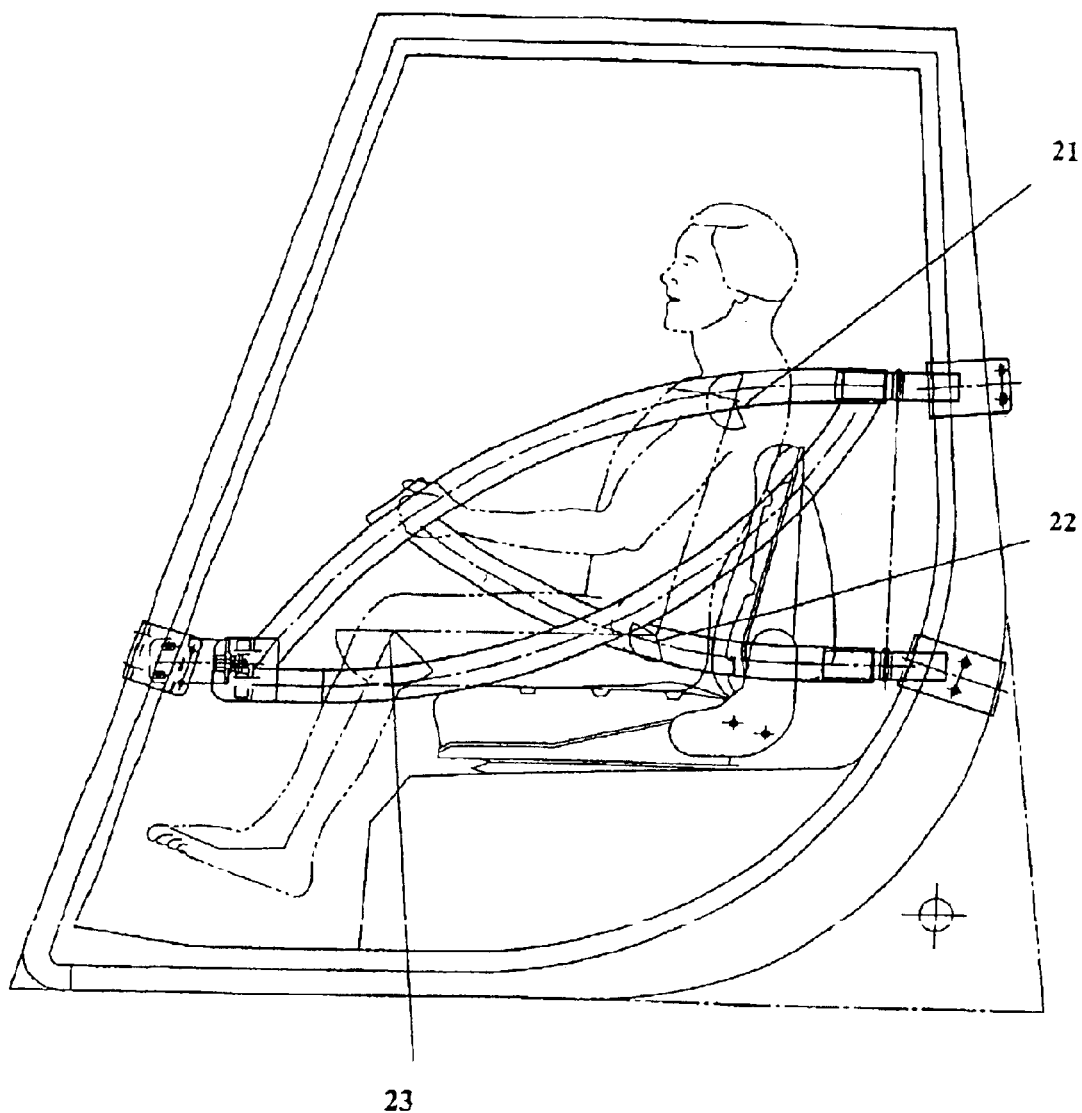
FIG. 2 shows a side view of a driver-protection roof for a fork-lift truck with the driver-protection system installed and with a driver (5. percentile female)
Figure 3:
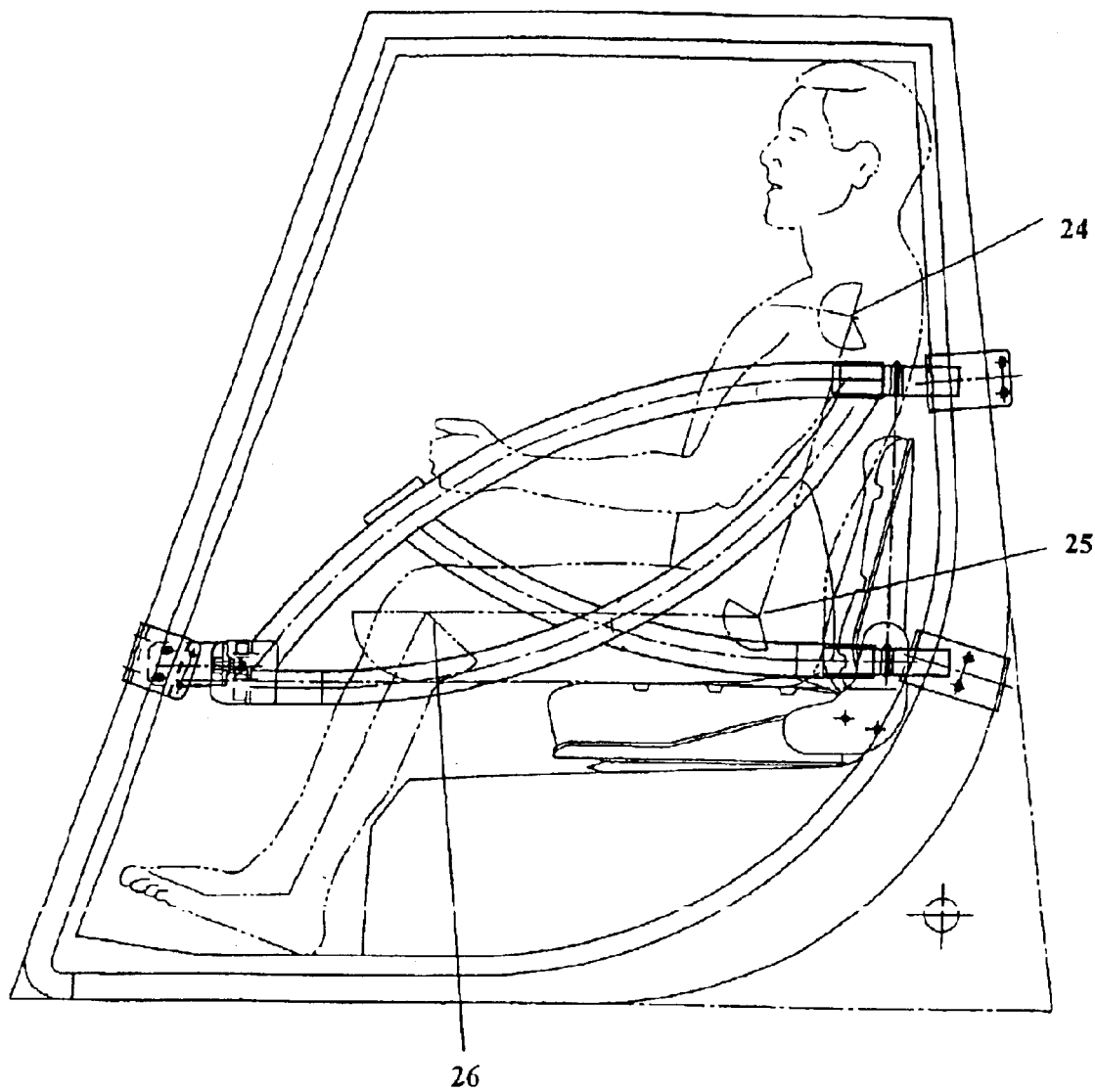
FIG. 3 shows a side view of a driver-protection roof for a fork-lift truck with the driver-protection system installed and with a driver (95th percentile male).

FIGS. 2 and 3 show a side view of a driver-protection roof with different heights of driver, and show the position of the respective shoulder points (21; 24), hip points (22; 25) and knee points (23; 26) for a short driver (FIG. 2) and a tall driver (FIG. 3). As is shown in these figures, the driver-protection system according to the invention reliably protects the driver irrespective of his/her height.

What is claimed is:

1. A mobile equipment having a driver-protection system, comprising:
   a driver's seat and a driver-protection roof which is open laterally at least on one side,
   front and rear members;
   an ellipsoidal bar-type frame with a top ellipse bar and a bottom ellipse bar;
   wherein the ellipse bars of the ellipsoidal bar-type frame are connected to one another at their ends, are articulated on a first member of the front and rear members by means of a hinge and are retained on a second member of the front and rear members by means of a locking system; and
   wherein the hinge is fitted on the first member above a backrest of the vehicle driver's seat, and the locking system is fitted on the second member, level with a seat surface of the driver's seat.

2. The mobile equipment according to claim 1, further comprising a retaining bar which starts approximately in the center of the bottom ellipse bar of the ellipsoidal bar-type frame and is articulated on the first member via an additional hinge, beneath the hinge, approximately level with the transition region between the backrest and the seat of the driver's seat.

3. The mobile equipment according to claim 2, further comprising, between the bottom ellipse bar and the retaining bar, a protective panel which is made of sheet metal and is provided with a securing means for a hip pad.

4. The mobile equipment according to claim 2, wherein the retaining bar is extended beyond the bottom ellipse bar to the top ellipse bar and is secured on the top ellipse bar.

5. The mobile equipment according to claim 2, wherein an actuating element for the locking system is provided on the top ellipse bar in the transition region between the top ellipse bar and the retaining bar.

6. The mobile equipment according to claim 2, wherein the retaining bar, bottom ellipse bar and top ellipse bar have a rectangular cross section.

7. Driver-protection system for mobile equipment, said mobile equipment being provided with a driver's seat having a seat surface and a backrest, a driver-protection roof open laterally at least on one side, and front and rear members;
   wherein said driver-protection system comprises:
   an ellipsoidal bar-type frame with a top ellipse bar and a bottom ellipse bar;
   wherein the ellipse bars of the ellipsoidal bar-type frame are connected to one another at their ends, are adapted to be articulated on a first member of the front and rear member by means of a hinge, and to be retained on a second member of the front and rear member by means of a locking system; and
   wherein the hinge is adapted to be fitted on the first member above the backrest of the driver's seat, and the locking system is adapted to be fitted on the second member, level with the seat surface of the driver's seat.

* * * * *

UNITED STATES PATENT AND TRADEMARK OFFICE
CERTIFICATE OF CORRECTION

PATENT NO. : 6,890,036 B2
DATED : May 10, 2005
INVENTOR(S) : Weiner et al.

It is certified that error appears in the above-identified patent and that said Letters Patent is hereby corrected as shown below:

Title page,
Item [12], "Wiener et al." should read -- Weiner et al. --.
Item [75], Inventors, "Uwe Wiener, Dusseldorf" should read
-- Uwe Weiner, Düsseldorf --; "Oliver Schroter, Muhlheim/Ruhr" should read
-- Oliver Schröter, Mülheim/Ruhr --.
Item [73], Assignee, "IWS, Ingenieurgesellschaft Weinter & Schröter mbH, Kamp-Lintfort (DE)" should read -- IWS, Ingenieurgesellschaft Weiner & Schröter mbH, Kamp-Lintfort (DE) --.

Signed and Sealed this

Sixth Day of September, 2005

JON W. DUDAS
*Director of the United States Patent and Trademark Office*